(12) United States Patent
Chung et al.

(10) Patent No.: US 10,141,830 B1
(45) Date of Patent: Nov. 27, 2018

(54) BURST OPERATION OF A SWITCHING CONTROLLER HAVING A PLURALITY OF FOLDBACK CURVES

(71) Applicant: SEMICONDUCTOR COMPONENTS INDUSTRIES, LLC, Phoenix, AZ (US)

(72) Inventors: Bonggeun Chung, Siheung-si (KR); Taesung Kim, Seoul (KR); Gwanbon Koo, Sunnyvale, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/799,192

(22) Filed: Oct. 31, 2017

(51) Int. Cl.
*H02M 1/08* (2006.01)
*H05B 33/08* (2006.01)
*H02M 3/335* (2006.01)
*H02M 1/00* (2006.01)

(52) U.S. Cl.
CPC ......... *H02M 1/08* (2013.01); *H02M 3/33523* (2013.01); *H05B 33/0815* (2013.01); *H05B 33/0851* (2013.01); *H02M 2001/0009* (2013.01); *H02M 2001/0035* (2013.01)

(58) Field of Classification Search
CPC ............ H02M 1/08; H02M 1/32; H02M 1/36; H02M 3/33507; H02M 3/33523; H02M 3/33561; H02M 3/33569; H02M 2001/0032; H02M 2001/0009; H05B 33/0815; H05B 33/0851; Y02B 70/1433; Y02B 70/1441; Y02B 70/1475

USPC .............................................. 363/21.01–21.18
See application file for complete search history.

(56) References Cited

U.S. PATENT DOCUMENTS

| | | | |
|---|---|---|---|
| 5,034,871 A * | 7/1991 | Okamoto | H02J 7/008 363/131 |
| 6,504,267 B1 | 1/2003 | Giannopoulos | |
| 7,133,300 B1 | 11/2006 | Yang | |
| 8,804,380 B2 | 8/2014 | Gao et al. | |
| 8,897,038 B2 * | 11/2014 | Li | H02M 3/33507 363/21.16 |
| 9,225,199 B2 * | 12/2015 | Teggatz | H02J 7/35 |

(Continued)

OTHER PUBLICATIONS

Fairchild Semiconductor Corp, "Design and Application of Primary-Side Regulation (PSR) PWM Controller", Nov. 16, 2011, Publisher: Fairchild Semiconductor Corp.

(Continued)

*Primary Examiner* — Yemane Mehari
(74) *Attorney, Agent, or Firm* — AMPACC Law Group, PLLC

(57) ABSTRACT

In an embodiment, a circuit for a Direct Current to Direct Current (DC-DC) converter comprises an input voltage detection circuit, an oscillator circuit, and a burst entry detection circuit. The input voltage detection circuit produces, using a voltage sense signal, a first input voltage indicator. The first input voltage indicator indicates a voltage range selected from a plurality of voltage ranges. The oscillator circuit selects, using the first indicator, a foldback curve from a plurality of foldback curves. The foldback curve is used to determine a blanking time of a gate signal. The burst entry detection circuit determines, using an indicator of an output power of the DC-DC converter, whether to operate the circuit in a burst mode.

20 Claims, 10 Drawing Sheets

(56) References Cited

U.S. PATENT DOCUMENTS

| | | |
|---|---|---|
| 9,444,349 B2 | 9/2016 | Sato |
| 9,755,530 B2 | 9/2017 | Luo et al. |
| 9,893,638 B1 | 2/2018 | Strijker |
| 9,991,806 B2 | 6/2018 | Gong |
| 2002/0080625 A1 | 6/2002 | Goyhenetche et al. |
| 2008/0265849 A1 | 10/2008 | Lee |
| 2011/0103101 A1 | 5/2011 | Hiasa |
| 2011/0291575 A1 | 12/2011 | Shiu et al. |
| 2014/0016362 A1 | 1/2014 | Adragna et al. |
| 2014/0092647 A1 | 4/2014 | Ren et al. |
| 2014/0192565 A1 | 7/2014 | Wang |
| 2014/0192566 A1 | 7/2014 | Yang |
| 2015/0256062 A1* | 9/2015 | Shirahata .......... H02J 7/32 323/304 |
| 2016/0149490 A1 | 5/2016 | Nakamura |
| 2016/0359421 A1 | 12/2016 | Lin et al. |
| 2017/0047846 A1 | 2/2017 | Teo et al. |
| 2017/0317602 A1 | 11/2017 | Kleinpenning et al. |
| 2017/0338746 A1 | 11/2017 | Chen et al. |
| 2018/0019677 A1* | 1/2018 | Chung .......... H02M 3/155 |

OTHER PUBLICATIONS

Fairchild Semiconductor Corp, "Design Guideline for Primary Side Regulated (PSR) Flyback Converter Using FNA 103 and FSEZ13X7", Nov. 16, 2010.

Chung et al., "Variable Blanking Frequency for Resonant Converters", U.S. Appl. No. 15/636,833, filed Jun. 29, 2017.

* cited by examiner

*Burst Mode Not Shown*

BURST OPERATION OF A SWITCHING CONTROLLER HAVING A PLURALITY OF FOLDBACK CURVES

FIELD OF THE DISCLOSURE

The present disclosure relates to electrical circuits, and more particularly to Switched Mode Power Supply (SMPS) circuits.

BACKGROUND

A SMPS such as a DC-DC converter includes a switch element that is switched to convert a power source to a regulated DC output voltage. The DC-DC converter may have a flyback quasi-resonant (QR) topology that includes a resonant circuit. The resonant circuit may include a parasitic capacitance of the switch element and an inductance of a winding of a transformer.

In QR switching, energy is stored in the transformer during a charging phase when the switch element is turned on. The energy stored in the transformer is released in a discharge phase when the switch element is turned off.

After the energy stored in the transformer is dissipated (that is, when the discharge phase ends), the resonant circuit causes a node voltage of the switch element to ring. In a technique known as valley switching, the switch element is turned on to begin a next charging phase in response to the resonant ring reaching a low level, that is, in the valley of the resonant ring.

To prevent the switch element from inadvertently turning on, the switch element is prevented from being turned on during a blanking time. The blanking time may be controlled according to an indication of a load current to improve the efficiency of the DC-DC converter. The relationship between the load current and the blanking time is called a foldback curve. The foldback curve can be expressed as a relationship between a feedback voltage corresponding to the load current and a frequency corresponding to the inverse of the blanking time.

To further improve the efficiency of the DC-DC converter, a plurality of foldback curves respectively corresponding to a plurality of operating conditions may be employed. For example, a first foldback curve may be used when an input voltage to the DC-to-DC converter (herein referred to as a line voltage) is high, and a second foldback curve may be used when the line voltage is low.

To improve the efficiency of a DC-DC converter under light load conditions, the DC-DC converter may enter a burst mode. In an illustrative burst mode, wherein a feedback voltage decreases as the output voltage increases and increases as the output voltage decreases, switching of the switching element stops in response to the feedback voltage dropping below a first threshold, and does not resume until the feedback voltage rises above a second threshold higher than the first threshold.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

DETAILED DESCRIPTION

Figure 1:
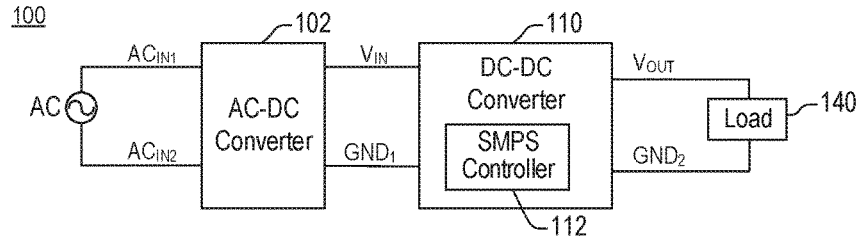
FIG. 1 illustrates an electronic system including a DC-DC converter circuit (hereinafter a DC-DC converter) according to an embodiment.

Embodiments relate to burst mode operation of a switching power converter (e.g., a switch mode power supply (SMPS)) having a plurality of foldback curves, such as a plurality of foldback curves including a first foldback curve for use with high line voltages, and a second foldback curve for use with low line voltages.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

In an embodiment, a circuit for a Direct Current to Direct Current (DC-DC) converter comprises an input voltage detection circuit, an oscillator circuit, and a burst entry detection circuit. The input voltage detection circuit produces, using a voltage sense signal, a first input voltage indicator. The first input voltage indicator indicates a voltage range selected from a plurality of voltage ranges. The oscillator circuit selects, using the first indicator, a foldback curve from a plurality of foldback curves. The foldback curve is used to determine a blanking time of a gate signal. The burst entry detection circuit determines, using an indicator of an output power of the DC-DC converter, whether to operate the circuit in a burst mode.

In an embodiment, a switching power converter is controlled by determining a voltage range, selecting a foldback curve, determining a blanking time of a switching device, and operating the switching power converter in burst mode when predetermined criteria are met. The voltage range is determined according to an input voltage of the switching power converter from a plurality of voltage ranges. The foldback curve is selected according to the voltage range. The blanking time is determined according to the selected foldback curve and a feedback signal. The feedback signal corresponds to an output voltage of the switching power converter. The switching power converter is operated in the burst mode in response to an indication that an output power of the switching power converter is below a predetermined power threshold and a first foldback curve is selected; or in response to the indication that an output power of the switching power converter is below the predetermined power threshold when a second foldback curve is selected. The second foldback curve is different than the first foldback curve, and a value of the feedback signal corresponding to the predetermined power threshold on the first foldback curve corresponds to a power level substantially above the predetermined power threshold on the second foldback curve.

In an embodiment of a DC-DC Converter, entry into a burst mode occurs at or near a predetermined power level regardless of which of a plurality of foldback curves (e.g., which of a high line foldback curve or low line foldback curve) is being used. In an embodiment, each foldback curve has an associated minimum current threshold for controlling an on time of a primary-side switch of the DC-DC converter during burst mode operation. In an embodiment, a single minimum current threshold is used to control the on time of the primary-side switch during burst mode operation, regardless of which foldback curve is being used. In an embodiment, burst mode entry is controlled by estimating a power output of the DC-DC converter using a sensed voltage of a primary side of the DC-DC converter and an integrated sensed current of the primary side.

FIG. 1 illustrates an electronic system 100 according to an embodiment. The electronic system 100 includes an Alternating Current (AC) to (Direct Current (DC) (AC-DC) converter circuit 102, a DC-DC Converter circuit 110, and a load 140.

The AC-DC converter circuit 102 receives AC power on first and second AC inputs $AC_{IN1}$ and $AC_{IN2}$. The AC-DC converter circuit 102 converts the AC power to DC power and supplies the DC power as the input voltage $V_{IN}$ to the DC-DC Converter circuit 110, using the first ground $GND_1$ as a return path for the DC power. In an embodiment, the AC-DC converter circuit 102 may include a Power Factor Correction (PFC) circuit.

The DC-DC converter circuit 110 (hereinafter referred to as the DC-DC converter 110) converts the input voltage $V_{IN}$ to a DC output voltage $V_{OUT}$ which is supplied to the load 140. A second ground $GND_2$ is used as a return path for the DC power supplied to the load 140. In an embodiment, the second ground $GND_2$ is electrically isolated from the first ground $GND_1$.

The DC-DC converter 110 includes a Switch Mode Power Supply (SMPS) controller circuit 112 (hereinafter referred to as the SMPS controller 112) that controls operations of the DC-DC converter 110.

The SMPS controller 112 may control the DC-DC converter 110 using a plurality of foldback curves. The foldback curve used to control the operational frequency may be selected according to a value of the input voltage $V_{IN}$. In an embodiment, the plurality of foldback curves respectively correspond to a plurality of voltage ranges, and the SMPS controller 112 selected the foldback curve corresponding to the voltage range that the input voltage $V_{IN}$ is in.

The SMPS controller 112 may control the DC-DC converter 110 in a burst mode according to one or more of an output voltage $V_{OUT}$, a value of the input voltage $V_{IN}$, and an indication of a power output of the DC-DC converter 110. The DC-DC converter 110 is controlled so as to operate in the burst mode when the output power of the DC-DC converter is below one or more predetermined burst mode power thresholds, and does not operate in the burst mode otherwise.

In an embodiment, the DC-DC converter 110 has a plurality of predetermined burst mode power thresholds respectively corresponding to the plurality of foldback curves, the plurality of predetermined burst mode power thresholds all falling within a limited range (for example, 33% to 37% of maximum output power, or ±5% of a target power level). In an embodiment, a single burst mode power thresholds (for example, 35% of maximum output power) is used for all of the foldback curves.

Figure 2:
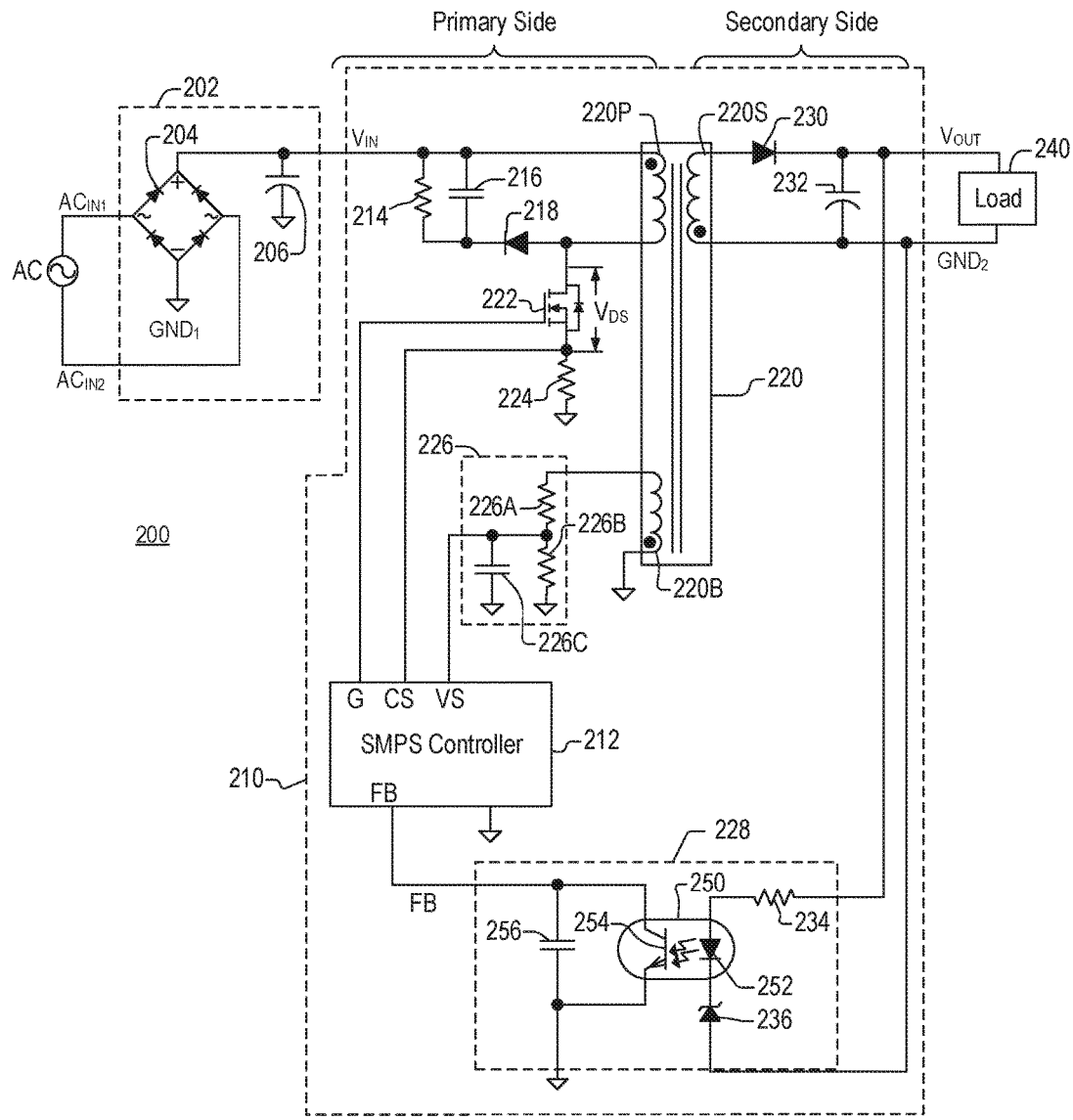
FIG. 2 illustrates an electronic system including a DC-DC converter according to an embodiment.

FIG. 2 illustrates an electronic system 200 according to an embodiment, which may be an embodiment of the electronic system 100 of FIG. 1. The electronic system 200 includes an AC-DC converter circuit 202, a DC-DC converter 210, and a load 240.

The AC-DC converter circuit 202 includes a bridge rectifier 204 and a filter capacitor 206. The AC-DC converter circuit 202 rectifies an AC input voltage received on first and second AC inputs $AC_{IN1}$ and $AC_{IN2}$ to provide unregulated DC power on to an input voltage $V_{IN}$ of the DC-DC Converter 210. The current produced on the input voltage $V_{IN}$ returns through a first ground $GND_1$, indicated in FIG. 2 by a triangular ground symbol.

The DC-DC converter 210 includes a primary side and a secondary side. The DC-DC Converter circuit 210 includes a transformer 220 to transfer energy from the primary side to the secondary side and to sense the input voltage $V_{IN}$. The transformer 220 includes a primary winding 220P, a secondary winding 220S, and an auxiliary winding 220B. In an embodiment, the transformer 220 is a ferrite core transformer.

The DC-DC Converter circuit 210 also includes a feedback circuit 228 to provide feedback from the secondary side to the primary side. The feedback circuit 228 may produce a feedback signal FB according to an output of the DC-DC Converter circuit 210. The feedback circuit 228 may provide electrical isolation between the primary and secondary sides of the DC-DC Converter circuit 210.

In an embodiment, the feedback circuit 228 includes an opto-isolator 250 comprising a Light Emitting Diode (LED) 252 and a photo-transistor 254. An anode of the LED 252 is coupled to an output voltage $V_{OUT}$ of the DC-DC Converter circuit 210 through a feedback circuit resistor 234. A cathode of the LED 252 is coupled to second ground $GND_2$ through a reverse-biased Zener diode 236.

A first conduction terminal of the photo-transistor 254 is coupled to the feedback signal FB. A second conduction terminal of the photo-transistor 254 is coupled to the first ground $GND_1$. A feedback circuit capacitor 256 is coupled across the photo-transistor 254.

The LED 252 emits light according to an amount by which a voltage value of the output voltage $V_{OUT}$, relative to the second ground $GND_2$, exceeds a Zener voltage of the Zener diode 236. A current of the feedback signal FB flowing through the photo-transistor 254 increases as the amount of light emitted by the LED 252 increases. As a result, a voltage value of the feedback signal FB decreases according to the amount by which the voltage value of the output voltage $V_{OUT}$, relative to the second ground $GND_2$, exceeds the Zener voltage of the Zener diode 236. A feedback circuit capacitor 256 operates to low-pass filter the feedback signal FB.

The primary side of the DC-DC Converter circuit 210 includes the primary winding 220P of the transformer 220, a switching device 222, and a current sense resistor 224. A first terminal of the primary winding, having a first instantaneous polarity, is coupled to the input voltage $V_{IN}$, a second terminal of the primary winding 220P, having a second instantaneous polarity, is coupled to a first conduction terminal of the switching device 222. A second conduction terminal of the switching device 222 is coupled to a first terminal of the current sense resistor 224. A second terminal of the current sense resistor is coupled to the first ground $GND_1$. In the embodiment shown in FIG. 2, the switching device 222 is an n-channel Metal Oxide Semiconductor Field Effect Transistor (nMOSFET).

The primary side further includes a snubbing circuit coupled across the primary winding 220P. The snubbing circuit includes a snubbing resistor 214, a snubbing capacitor 216, and a snubbing diode 218. The snubbing diode 218 is couple between the second terminal of the primary winding 220P and a first terminal of the snubbing capacitor 216. The second terminal of the snubbing capacitor 216 is coupled to the first terminal of the primary winding 220P. First and second terminals of the snubbing resistor 214 are respectively connected to the first and second terminals of the snubbing capacitor 216. The snubbing circuit operates to prevent high-voltage transients that would otherwise arise when current through the primary winding 220P is interrupted, thereby reducing electromagnetic interference (EMI) and protecting the switching device 222.

The primary side further includes a Switched Mode Power Supply (SMPS) controller 212 according to an embodiment. The SMPS controller 212 receives a current sense signal CS from the first terminal of the current sense resistor 224, a feedback signal FB from the feedback circuit 228, and a voltage sense signal VS. The SMPS controller produces a gate signal G according to the current sense signal CS, the feedback signal FB, and the voltage sense signal VS from a Voltage Sense (VS) filter circuit 226. In an embodiment, the SMPS controller 212 provides a predetermined current for the feedback signal FB.

The SMPS controller 212 produces the gate signal G using a plurality of foldback curves. The foldback curve used to produce the gate signal G may be selected according to a value of the input voltage $V_{IN}$ determined using the voltage sense signal VS. The SMPS controller 112 may operate in a burst mode according to one or more of a voltage value of the feedback signal FB, a voltage value of the current sense signal CS, a voltage value corresponding to the input voltage $V_{IN}$, an output power estimate, and one or more burst mode threshold values that may be determined according to voltage values of the voltage sense signal VS.

The primary side further includes the VS filter circuit 226. The VS filter circuit 226 produces the voltage sense signal VS using a signal received from a first terminal, having the second instantaneous polarity, of the auxiliary winding 220B. A second terminal, having the first instantaneous polarity, of the auxiliary winding 220B is coupled to the first ground $GND_1$.

In an embodiment, the VS filter circuit 226 may include first and second voltage divider resistors 226A and 226B and a VS filter capacitor 226C. The VS filter circuit 226 operates to produce the voltage sense signal VS by dividing and low-pass filtering a voltage across the auxiliary winding 220B.

The secondary side of the DC-DC Converter circuit 210 includes the secondary winding 220S of the transformer 220, a rectifying device 230, and an output capacitor 232. In the embodiment shown, the rectifying device 230 is a diode. In another embodiment, the rectifying device may be a synchronous rectifier.

A first terminal of the secondary winding 220S, having the second instantaneous polarity, is coupled to an anode of the rectifying device 230. A second terminal of the secondary winding 220S, having the first instantaneous polarity, is coupled to second ground $GND_2$. A cathode of the rectifying device 230 is coupled to a first terminal of the output capacitor 232 and to the output voltage $V_{OUT}$. A second terminal of the output capacitor 232 is coupled to the second ground $GND_2$.

The secondary winding 220S discharges energy stored in the transformer 220 as a current through the rectifying device 230. The current through the rectifying device 230 charges the output capacitor 230 and is provided to the load 240 as the output voltage $V_{OUT}$, and then returns through the second ground $GND_2$.

Figure 3A:
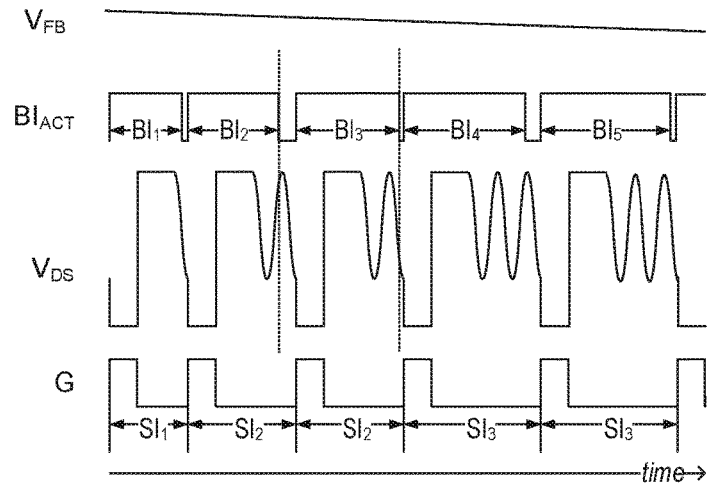
FIG. 3A illustrates waveforms of an operation of a DC-DC converter according to an embodiment.

FIG. 3A illustrates waveforms of an operation of a DC-DC converter, such as the DC-DC converter 210 of FIG. 2, according an embodiment. The waveforms include a feedback voltage $V_{FB}$ such as that shown in FIG. 2, a signal indicating that a blanking interval is active $BI_{ACT}$, a drain source voltage $V_{DS}$ across a primary side switching device such as the switching device 222 of FIG. 2, and a gate signal G that controls the switching device.

In FIG. 3A, the feedback voltage FB decreases, indicating the output voltage of the DC-DC converter is increasing. The durations of the blanking intervals $BI_1$ to $BI_5$ of the $BI_{ACT}$ signal increase as the feedback voltage FB decreases, so that $BI_1 < BI_2 < BI_3 < BI_4 < BI_5$.

As a result of the increase in the durations of the blanking intervals $BI_1$ to $BI_5$, intervals between the activation of the gate signal G increase. The intervals increase in a step-wise fashion because of the use of valley switching. As a result, in the example shown, blanking intervals $BI_1$, $BI_2$, $BI_3$, $BI_4$, and $BI_5$ respectively produce switching intervals SI1, $SI_2$, $SI_2$, $SI_3$, and $SI_3$. For example, both the second and third blanking intervals, having respective durations $BI_2$ and $BI_3$, where $BI_2 < BI_3$, end between the first and second valley after the gate signal G is turned off, as shown by the dashed vertical lines in FIG. 3A. As a result, for both the second and third blanking intervals, the gate signal G turns on at the second valley, a switching interval $SI_2$ after the previous turning on of the gate signal G.

Increasing the switching interval reduces the amount of power transferred from the primary side of the DC-DC converter to the secondary side of the DC-DC converter.

Figure 3B:
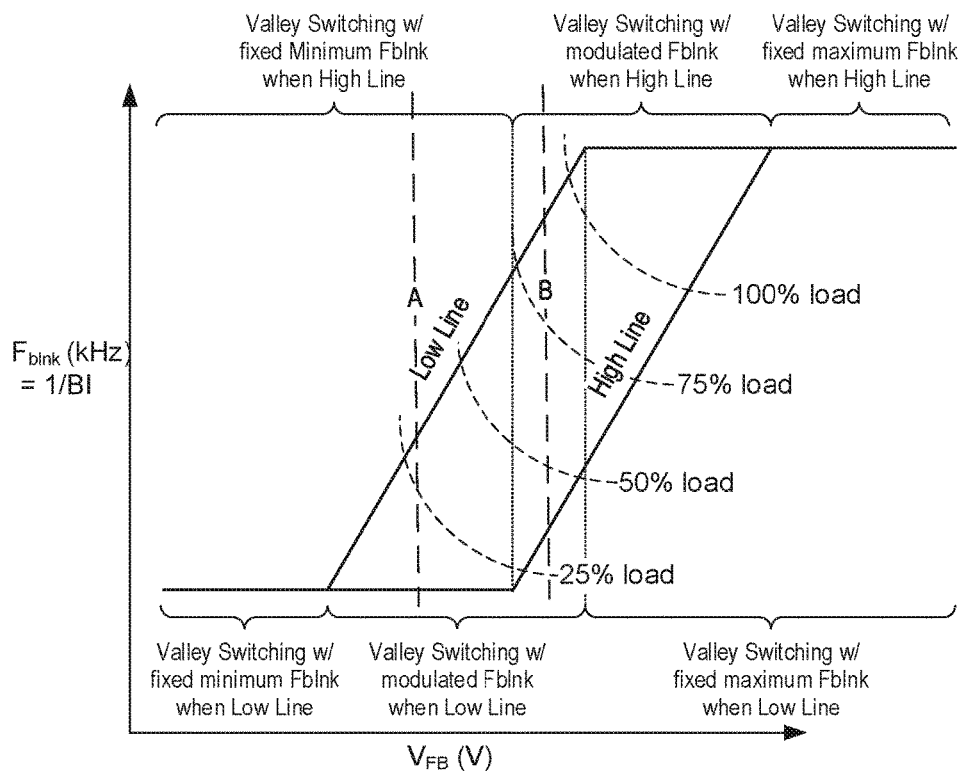
FIG. 3B illustrates foldback curves of an operation of a DC-DC converter according to an embodiment.

FIG. 3B illustrates foldback curves of a DC-DC converter, such as the DC-DC converter 210 of FIG. 2, according to an embodiment. The foldback curve shows the relationship between the feedback voltage $V_{FB}$ and the blanking frequency $F_{blnk}$, where the feedback voltage $V_{FB}$ decreases with increases in an output voltage of the DC-DC converter and the blanking frequency $F_{blnk}$ is the inverse of a blanking interval.

In the illustrated embodiment, the DC-DC converter uses a first foldback curve when a line voltage is above a predetermined value (High Line) and a second foldback curve when a line voltage is below a predetermined value (Low Line). The use of separate foldback curves for low line and high line operation results in higher efficiency operation of the DC-DC converter by balancing the effects of switching losses and conduction losses. Switching losses are higher for the high line operation, and conduction losses are higher for low line operation, so the low line foldback curve provides higher blanking frequencies than the high line foldback curve at many values of the feedback voltage $V_{FB}$.

Also shown in FIG. 3B are lines indicating a load that corresponds to values of the feedback voltage $V_{FB}$. Because of the finite gain of the feedback circuit that produces the feedback voltage $V_{FB}$, when the output voltage of the DC-DC converter is steady, the output voltage will be below a target output voltage by an amount according to the current being supplied by the output voltage, that is, by the load or, equivalently, the output power. As a result, the value of the feedback voltage $V_{FB}$ when the output voltage is steady rises with the load on the output (i.e. the output power) of the DC-DC converter.

FIG. 3B illustrates operation of an embodiment with a burst mode disabled. Embodiments control burst mode operation when the burst mode is enabled in DC-DC converters including a plurality of foldback curves. Embodiments operate to increase the efficiency of DC-DC converters operating at light loads, such as loads below 30% of a predetermined design load, even when a line voltage supplied to the DC-DC converter may vary substantially, for example, between 90 and 264 volts in AC.

In the embodiments illustrated, burst mode may be more efficient for loads lower that 30%, and non-burst (that is, continuous) mode more efficient for loads greater than 30%, but embodiments are not limited thereto. The increase in efficiency is obtained in burst mode by switching less often than would be the case in continuous mode, as switching losses dominate over conduction losses under light load conditions.

As illustrated by lines A and B in FIG. 3B, there is no one value of the feedback voltage $V_{FB}$ that corresponds to an appropriate threshold for entering into burst mode for both foldback curves. If a value correlating to line A were to be used, the DC-DC converter operates in the more-efficient burst mode at 30% and less loads under the low line condition, but does not operate in the burst mode until the load is substantially less than 25% under the high line condition. If a value correlating to line B were to be used, the DC-DC converter operates in the more-efficient burst mode at 30% and less loads under the high line condition, but also operates in the burst mode for loads in the 30% to 80% range under the low line condition, were the continuous mode would be more efficient. It may also cause other problems like an audible noise issue in the system, which would be undesirable.

Embodiments may provide different criteria for transitioning to a burst mode depending on which of a plurality of foldback curves is employed by a DC-DC converter. In embodiments, a plurality of respective voltage thresholds are used for the plurality of foldback curves to determine whether to enter the burst mode. In other embodiments, an indication of the output power is used to control entry into the burst mode.

Figure 4:
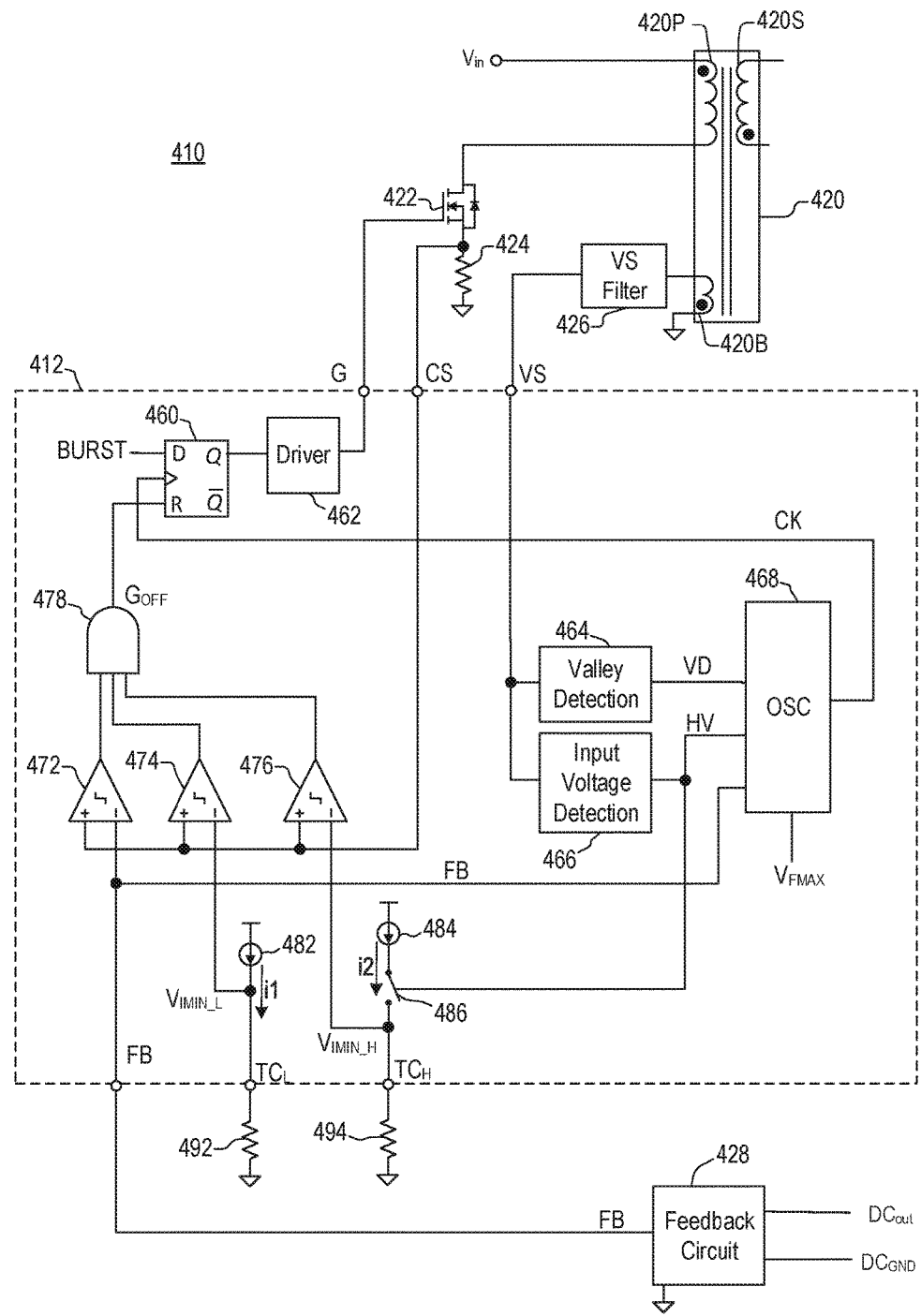
FIG. 4 illustrates portions of a DC-DC converter including a Switched Mode Power Supply (SMPS) controller according to an embodiment.

FIG. 4 illustrates portions of a DC-DC converter 410 including a SMPS controller 412 according to an embodiment. The DC-DC converter 410 may be included in the DC-DC converter 210 of FIG. 2.

The illustrated portions of the DC-DC converter 410 include a transformer 420, a switching device 422, a current sense resistor 424, a VS filter 426, and a feedback circuit 428. Each of these may be as described for the corresponding components in FIG. 2; for example, the feedback circuit 428 may include the circuit shown for the feedback circuit 228 of FIG. 2.

The SMPS controller 412 receives a voltage sense signal VS from the VS filter 426, a current sense signal CS from the junction of the switching device 422 and the current sense resistor 424, and a feedback signal FB from the feedback circuit 428. The voltage sense signal VS has a value corresponding to a voltage drop across a primary winding 420P of the transformer 420. The current sense signal CS has a value corresponding to a current through the switching device 422. The feedback signal FB has a value $V_{FB}$ corresponding to a difference between a desired output voltage and an output voltage of the DC-DC converter 410, the output voltage being produced using the secondary winding 420S of the transformer 420.

The SMPS controller 412 controls the gate signal G according to the current sense signal CS. the voltage sense signal VS, the feedback signal FB, a low line threshold determined according to a low threshold resistor 492 coupled to a low line threshold configuration pin $TC_L$ and a high line threshold determined according to a high threshold resistor 494 coupled to a high line threshold configuration pin $TC_H$.

The SMPS controller 412 includes an output latch 460 and a driver 462 that produce the gate signal G. In the embodiment shown in FIG. 4, the output latch 460 is a D-type flip-flop including a reset input. The driver 462 may include a buffer, a level shifter, a compensation circuit, a protection circuit, and the like. In an embodiment, the driver 462 may be replaced by a single conductor, that is, the gate signal G may be produced directly from the Q output of the output latch 460.

The SMPS controller 412 further includes a valley detection circuit 464, an input voltage detection circuit 466, and an oscillator 468. The oscillator 468 produces a clock signal CK of the output latch 460 according to signals from the valley detection circuit 464 and the input voltage detection circuit 466, the feedback signal FB, and the maximum frequency voltage $V_{FMAX}$.

The valley detection circuit 464 produces a valley detect signal VD that is asserted to indicate the occurrence of a valley in the voltage sense signal VS. In an illustrative embodiment, the valley detection circuit 464 compares a value of the voltage sense signal VS to a threshold value to detect a valley.

The input voltage detection circuit 466 generates a high voltage detect signal HV that is asserted when the voltage sense signal VS indicates that the input voltage Vin is greater than a predetermined value. In an illustrative embodiment, the input voltage detection circuit 466 generates the high voltage detect signal HV by measuring a current from the auxiliary winding 420B when the voltage sense signal VS is clamped at a predetermined value (for example, zero volts).

The oscillator 468 generates a blanking interval using a foldback circuit implementing a plurality of foldback curves. The foldback curve used is selected from among the plurality of foldback curves according to the high voltage detect signal HV. The foldback circuit produces a blanking interval value using a value of the selected foldback curve according to a value of the feedback signal FB. The blanking interval value may then be limited to lie between a minimum blanking interval value and a maximum blanking interval value. The maximum blanking interval value may correspond to the maximum frequency voltage $V_{FMAX}$.

In an illustrative embodiment, higher values of the blanking interval value correspond to higher blanking frequencies (that is, to shorter blanking intervals) and lower values of the blanking interval value correspond to lower blanking frequencies (that is, to longer blanking intervals).

In an illustrative embodiment, the oscillator 468 initiates the blanking interval in response to a rising edge of the clock signal CK. The oscillator 468 terminates the blanking interval after a duration corresponding to the blanking interval value. The oscillator 468 generates a pulse on the clock signal CK each time the valley detect signal VD is asserted outside of a blanking interval. In an embodiment, the blanking interval value is inversely proportional to the duration of the blanking interval.

The SMPS controller 412 further includes first and second current sources 482 and 484 and a switch device 486. The first current source 482 provides a predetermined first current i1 to the low threshold resistor 492 to produce a low line minimum current threshold $V_{IMIN\_L}$. A value of the low line minimum current threshold $V_{IMIN\_L}$ may be equal to the first current i1 times a resistance of the low threshold resistor 492.

The second current source 484 provides a predetermined second current i2 to the high threshold resistor 494 to produce a high line minimum current threshold $V_{IMIN\_H}$ when the switch device 486 is closed. The high line minimum current threshold $V_{IMIN\_H}$ has a value equal to a ground voltage when the switch device 486 is open. The switch device 486 is closed when the high voltage detect signal HV is asserted, and opens when the high voltage detect signal HV is deasserted. A value of the high line minimum current threshold $V_{IMIN\_H}$ may be equal to the second current i2 times a resistance of the high threshold resistor 494 when the high voltage detect signal HV is asserted, and may be zero otherwise.

The SMPS controller 412 further includes first, second, and third comparators 472, 474, and 476, and an AND gate 478. The first comparator 472 receives the feedback signal FB and the current sense signal CS and produces a logic high value on its output when the feedback signal FB is less than the current sense signal CS, and produces a logic low value on its output otherwise. The second comparator 474 receives the low line minimum current threshold $V_{IMIN\_L}$ and the current sense signal CS and produces a logic high value on its output when the low line minimum current threshold $V_{IMIN\_L}$ is less than the current sense signal CS, and produces a logic low value on its output otherwise. The third comparator 476 receives the high line minimum current threshold $V_{IMIN\_H}$ and the current sense signal CS and produces a logic high value on its output when the high line minimum current threshold $V_{IMIN\_H}$ is less than the current sense signal CS, and produces a logic low value on its output otherwise.

The AND gate 478 receives the outputs of the first, second, and third comparators 472, 474, and 476 and produces a gate off signal $G_{OFF}$ that is high when all of the outputs of the comparators are high, and is low otherwise. Accordingly, the gate off signal $G_{OFF}$ is equal to:

$$G_{OFF} = CS > FB \text{ AND } CS > V_{IMIN\_L} \text{ AND } CS > V_{IMIN\_H} \quad \text{Equation 1}$$

In an embodiment wherein the high line minimum current threshold $V_{IMIN\_H}=0$ when the high voltage detect signal HV is deasserted and is greater than the low line minimum current threshold $V_{IMIN\_L}$ when the high voltage detect signal HV is asserted, the gate off signal $G_{OFF}$ is equal to:

$$G_{OFF} = \begin{cases} FB < CS \text{ AND } V_{IMIN\_L} < CS, & HV \text{ deasserted} \\ FB < CS \text{ AND } V_{IMIN\_H} < CS, & HV \text{ asserted} \end{cases} \quad \text{Equation 2}$$

or equivalently, for a selected minimum current threshold $V_{IMIN}$:

$$V_{IMIN} = \begin{cases} V_{IMIN\_L}, & HV \text{ deasserted} \\ V_{IMIN\_H}, & HV \text{ asserted} \end{cases} \quad \text{Equation 3}$$

$$G_{OFF} = CS > \text{MAX}(FB, V_{IMIN}) \quad \text{Equation 4}$$

When the gate off signal $G_{OFF}$ is asserted, the output latch 460 is reset, the output Q of the output latch 460 goes low, and the switching device 422 is turned off. The output Q of the output latch 460 will go high on the next pulse on the clock signal CK that occurs when the burst signal BURST is high.

The burst signal BURST is used to at times prevent the activation of the switching device 422 when the SMPS controller 412 is in a burst mode. When the SMPS controller 412 is not in the burst mode, the burst signal BURST is held high, enabling activation of the switching device 422. In embodiments, the SMPS controller 412 enters and exits the burst mode according to the load on the output of the DC-DC converter 410. In an embodiment, the SMPS controller 412 determines the load on the output of the DC-DC converter 410 using the feedback signal FB.

Figure 5A:
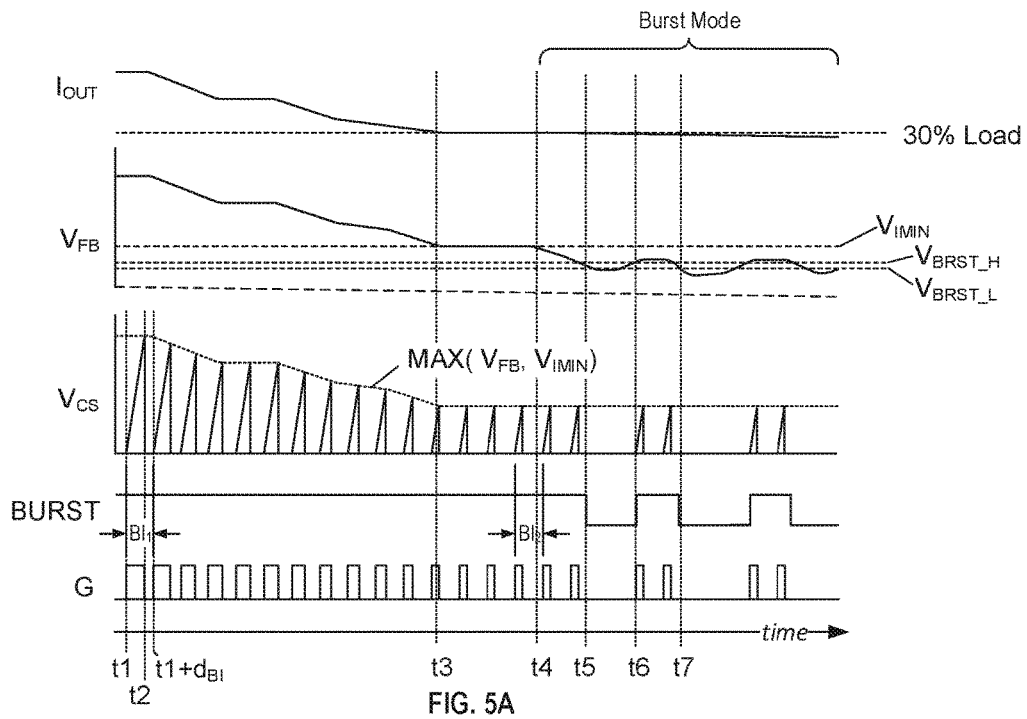
FIG. 5A illustrates waveforms of an operation of a DC-DC converter according to an embodiment.

FIG. 5A illustrates waveforms of burst mode operation of the DC-DC converter 410 according to an embodiment. The illustrated waveforms include an output current $I_{OUT}$ of the DC-DC converter 410, a feedback signal voltage $V_{FB}$ corresponding to a voltage value of the feedback signal FB, a current sense voltage $V_{CS}$ corresponding to a value of the current sense signal CS, the burst signal BURST, and the gate signal G.

A cycle of operation begins at a first time t1. The gate signal G is asserted, and a first blanking interval $BI_1$ having a duration $d_{BI}$ is initiated. The gate signal G being asserted causes current to flow in a primary winding of the DC-DC converter 410, which current increases over time, causing the current sense voltage $V_{CS}$ to rise.

At a second time t2, the current sense voltage $V_{CS}$ becomes greater than the maximum of the value of the feedback signal voltage $V_{FB}$ and the selected minimum current threshold $V_{IMIN}$, i.e., MAX ($V_{FB}$, $V_{IMIN}$). At the second time t2, MAX ($V_{FB}$, $V_{IMIN}$) is equal to the feedback signal voltage $V_{FB}$. As a result, the gate signal G is deasserted. In this way, the current sense voltage $V_{CS}$ and the value of MAX ($V_{FB}$, $V_{IMIN}$) control the duration of the assertion of the gate signal G, thus controlling how much power is delivered to the transformer of the DC-DC converter 410 by each pulse.

At an end of the first blanking interval $BI_1$, that is, at time $t1+d_{BI}$, because the burst signal BURST is asserted, the gate signal G may be asserted again. The cycle that began at the first time t1 then repeats.

At a third time t3, the output current $I_{OUT}$ decreases until it corresponds to approximately a 30% load level, as indicated by the value of MAX($V_{FB}$, $V_{IMIN}$) being equal to the selected minimum current threshold $V_{IMIN}$. At this load level, the power being supplied to the secondary side of the DC-DC converter 410 may exceed the power being supplied to the load.

As a result, the output voltage of the DC-DC converter rises in the period following a fourth time t4, causing the feedback signal voltage $V_{FB}$ to decrease below the selected minimum current threshold $V_{IMIN}$, and the DC-DC converter 410 operates in the burst mode. In the burst mode, the feedback signal voltage $V_{FB}$ does not control the duration of the on time of the switching device 422, but instead controls whether the switching device 422 is allowed to be turned on via the burst signal BURST. The first, second, and third comparators 472, 474, and 476 and the AND gate 478 provide the functions of an on time determination circuit.

At a fifth time t5, the feedback signal voltage $V_{FB}$ drops below a burst low threshold $V_{BRST\_L}$. In response, the burst signal BURST is deasserted, which prevents the assertion of the gate signal G.

Because the gate signal G is prevented from being asserted, no additional power is supplied to the secondary side, and the continuing power draw by the load causes the output voltage to decrease, which causes the feedback signal voltage $V_{FB}$ to eventually increase in the period following the fifth time t5.

At a sixth time t6, the feedback signal voltage $V_{FB}$ rises above a burst high threshold $V_{BRST\_H}$, causing the burst signal BURST to be asserted. The DC-DC converter 410 is still operating in the burst mode during this time. When the burst signal BURST is asserted, the gate signal G is periodically asserted in the manner described for the first time t1, and power is supplied to the secondary side. The power being supplied to the secondary side of the DC-DC converter 410 exceeds the power being supplied to the load. As a result, the output voltage of the DC-DC converter 410 rises, causing the feedback signal voltage $V_{FB}$ to decrease.

At a seventh time t7, the feedback signal voltage $V_{FB}$ drops below the burst low threshold $V_{BRST\_L}$, and the burst signal BURST is deasserted, which prevents the assertion of the gate signal G.

The DC-DC 410 converter continues to operate in burst mode until an exit criteria is satisfied. For example, in an illustrative embodiment, the DC-DC converter continues to operate in burst mode until the load increases enough to cause the feedback signal voltage $V_{FB}$ to rise above a selected minimum current threshold $V_{IMIN}$.

As shown in FIG. 5A, the entry into burst mode is a consequence of using the selected minimum current threshold $V_{IMIN}$ to determine the duration of pulses on the gate signal G instead of using the feedback signal voltage $V_{FB}$ to do so. This causes the DC-DC converter 410 to provide more power to the secondary side than is used by the load, which causes the output voltage of the DC-DC 410 converter to rise until the feedback signal voltage $V_{FB}$, which decreases with increases in the output voltage, drops low enough to trigger the de-assertion of the burst signal BURST.

Figure 5B:
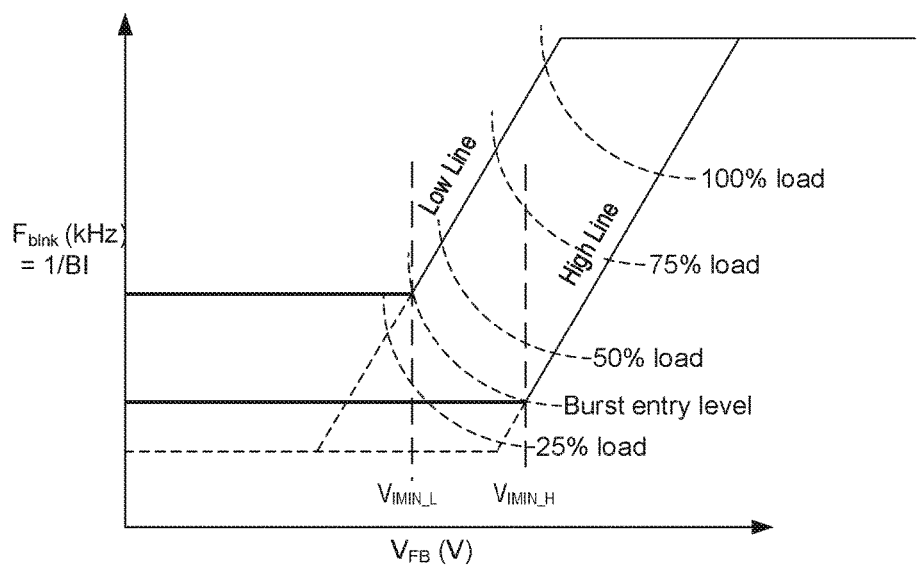
FIG. 5B illustrates foldback curves of an operation of a DC-DC converter according to an embodiment.

FIG. 5B illustrates the effect of using the selected minimum current threshold $V_{IMIN}$ to control entry and exit into burst mode. Operation in burst mode is shown in heavy lines, and operation not in the burst mode is shown by light lines. For reference, operation if burst mode was disabled is shown by dashed line.

When the DC-DC converter 410 operates in the low line condition, the selected minimum current threshold $V_{IMIN}$ is equal to the low line minimum current threshold $V_{IMIN\_L}$. As a result, the DC-DC converter 410 operates in the burst mode for loads less than approximately 30%, and the continuous mode otherwise.

When the DC-DC converter 410 operates in the high line condition, the selected minimum current threshold $V_{IMIN}$ is equal to the high line minimum current threshold $V_{IMIN\_H}$. As a result, the DC-DC converter 410 operates in the burst mode for loads less than approximately 30%, and the continuous mode otherwise.

In the illustrated embodiment, when the DC-DC converter 410 operates in the burst mode, the blanking frequency $F_{BLNK}$ (and the corresponding blanking interval) used is the same as the blanking frequency $F_{BLNK}$ at the point where the DC-DC converter 410 entered the burst mode. In the burst mode, the on time and blanking interval used to control the gate signal G are held constant, and the power output of the primary side of the DC-DC converter 410 is controlled by the frequency of the bursts of pulses and by how many pulses are in each burst, as shown in FIG. 5A.

Figure 6:
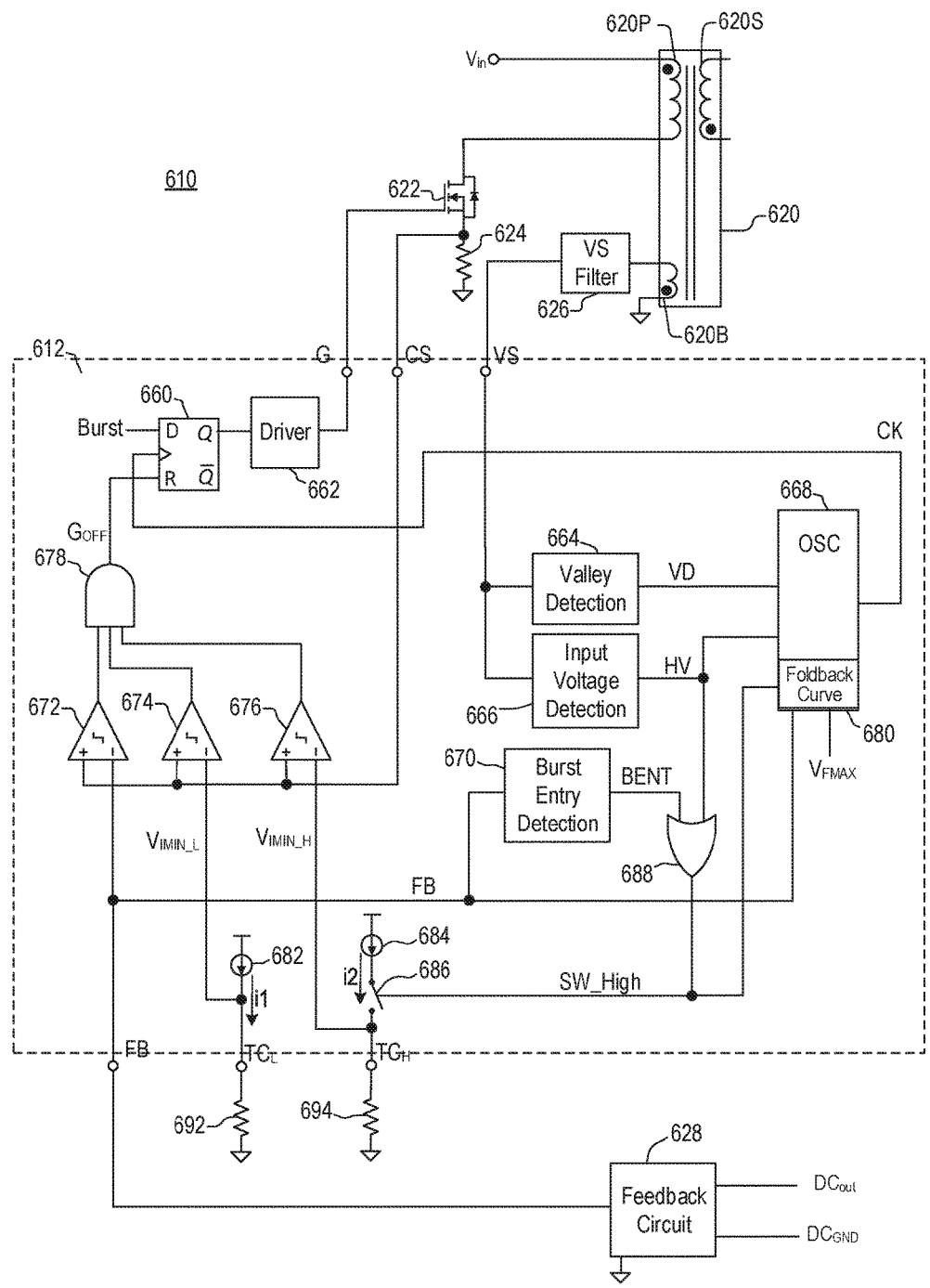
FIG. 6 illustrates portions of a DC-DC converter including a SMPS controller according to another embodiment.

FIG. 6 illustrates portions of a DC-DC converter 610 including a SMPS controller 612 according to an embodiment. Elements of FIG. 6 having references characters (e.g., 6XX) for which elements of FIG. 4 have corresponding references characters (e.g., 4XX) are as described for the corresponding element of FIG. 4, unless stated otherwise. For example, the valley detection circuit 664 of FIG. 6 is as described for the valley detection circuit 464 of FIG. 4.

Differences between FIG. 6 and FIG. 4 by includes the presence of a burst entry detect circuit 670 and an OR gate 688. The first, second and third comparators 672, 674, and 676 and the AND gate 678 of FIG. 6 perform the functions of an on time determination circuit, and not of a burst entry detection circuit. Furthermore, a foldback curve circuit 680 not illustrated in FIG. 4 is included the oscillator 668 of FIG. 6, but this does not limit the oscillator 468 of FIG. 4.

The burst entry detect circuit 670 produces a burst entry signal BENT according to the feedback signal FB. In an embodiment, the burst entry detect circuit 670 asserts the burst entry signal BENT in response to an average value corresponding to the feedback signal FB being less than a predetermined threshold. In another embodiment, the burst entry detect circuit 670 asserts the burst entry signal BENT in response to the feedback signal FB having a value less than a predetermined threshold for a predetermined period of time.

In FIG. 6, the switch device 686 is controlled by a switch control signal SW_High output by the OR gate 688, instead of being controlled by the high voltage detect signal HV. The OR gate 688 receives the high voltage detect signal HV and the burst entry signal BENT. Accordingly, the switch device 686 is turned on when one or more of the high voltage detect signal HV and the burst entry signal BENT are asserted, and turned off when both the high voltage detect signal HV and the burst entry signal BENT are de-asserted.

The switch control signal SW_High is also provided, along with the high voltage detect signal HV, to the foldback curve circuit 680. The foldback curve circuit 680 selects the high line foldback curve when one or more of the high voltage detect signal HV and the switch control signal SW_High are asserted, and selects the low line foldback curve when both of the high voltage detect signal HV and the switch control signal SW_High are de-asserted. The oscillator 668 determines a duration of a blanking interval according to the selected foldback curve.

Figure 7:
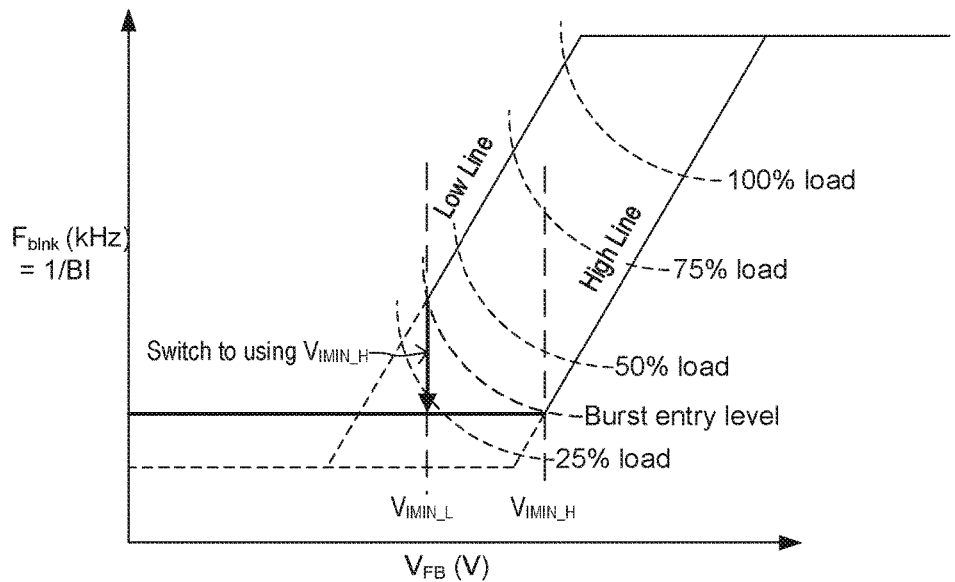
FIG. 7 illustrates foldback curves of an operation of a DC-DC converter according to an embodiment.

FIG. 7 illustrates an operation of the DC-DC converter 610. Operation in burst mode is shown in heavy lines, and operation not in the burst mode is shown by light lines. For reference, operation if burst mode was disabled is shown by dashed line.

When the DC-DC converter 610 operates in the low line condition and the burst entry signal BENT is de-asserted, the DC-DC converter 610 operates using the low line foldback curve and the low line minimum current threshold $V_{IMIN\_L}$.

When the DC-DC converter 610 operates in the low line condition and the burst entry signal BENT is asserted, the DC-DC converter 610 operates as if operating in the high line condition, using the high line foldback curve and selecting (effectively, when the high line minimum current threshold $V_{IMIN\_H}$ is greater than the low line minimum current threshold $V_{IMIN\_L}$) the high line minimum current threshold $V_{IMIN\_H}$ as a selected minimum current threshold $V_{IMIN}$. As a result, the on time of the gate signal G is controlled using the high line minimum current threshold $V_{IMIN\_H}$ when the DC-DC converter 610 is operating in the burst mode, which increases the efficiency of the DC-DC converter 610.

When the DC-DC converter 610 operates in the high line condition, it operates as described for the DC-DC converter 410 operating in the high line condition.

Figure 8A:
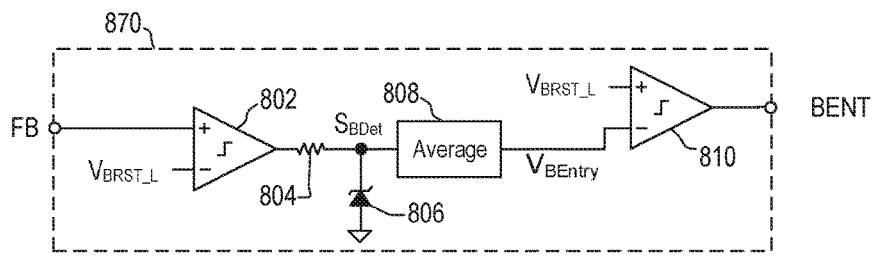
FIG. 8A illustrates a burst entry detection circuit of a DC-DC converter according to an embodiment.

FIG. 8A illustrates a burst entry detection circuit 870 of a DC-DC converter according to an embodiment. The burst entry detection circuit 870 is suitable for use as the burst entry detection circuit 670 of FIG. 6.

The burst entry detection circuit 870 includes first and second comparators 802 and 810, a current limiting resistor 804, a Zener diode 806, and an averaging circuit 808. The burst entry detection circuit 870 receives a feedback signal FB and generates a burst entry signal BENT according to a value of the feedback signal FB and a burst low threshold $V_{BRST\_L}$.

The first comparator 802 compares the value of the feedback signal FB to the burst low threshold $V_{BRST\_L}$ and asserts its output to indicate that the feedback signal FB has a value greater than the burst low threshold $V_{BRST\_L}$. The output of the first comparator 802 is provided to the Zener diode 806 through the current limiting resistor 804, producing a burst detect signal $S_{BDet}$ that is a rectangular wave having an amplitude equal to the breakdown voltage of the Zener diode 806. In an embodiment, the breakdown voltage of the Zener diode 806 is equal to the burst low threshold $V_{BRST\_L}$.

The averaging circuit 808 produces a burst entry voltage $V_{BEntry}$ having a value corresponding to an average of the values of the burst detect signal $S_{BDet}$ over an averaging period $t_{AVE}$. The averaging period $t_{AVE}$ may be selected according to a bandwidth of a feedback loop that uses the feedback signal FB.

The output of the averaging circuit 808 is provided to the second comparator 810, which compares it to the burst low threshold $V_{BRST\_L}$. The second comparator 810 asserts the burst entry signal BENT when the burst low threshold $V_{BRST\_L}$ is greater than the burst entry voltage $V_{BEntry}$.

Figure 8B:
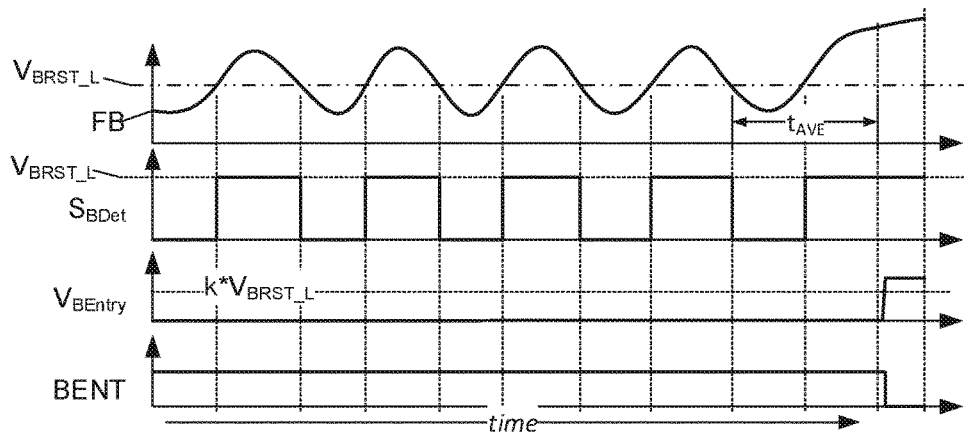
FIG. 8B illustrates waveforms of an operation of the burst entry detection circuit of FIG. 8A according to an embodiment.

FIG. 8B illustrates waveforms of the above-described operation of the burst entry detection circuit 870 of FIG. 8A, according to an embodiment. As can be seen in FIG. 8B, the burst entry detection circuit 870 asserts the burst entry signal BENT when the feedback signal FB when averaged over the averaging period $t_{AVE}$, less than the burst low threshold $V_{BRST\_L}$, and de-asserts the burst entry signal BENT otherwise.

Figure 9A:
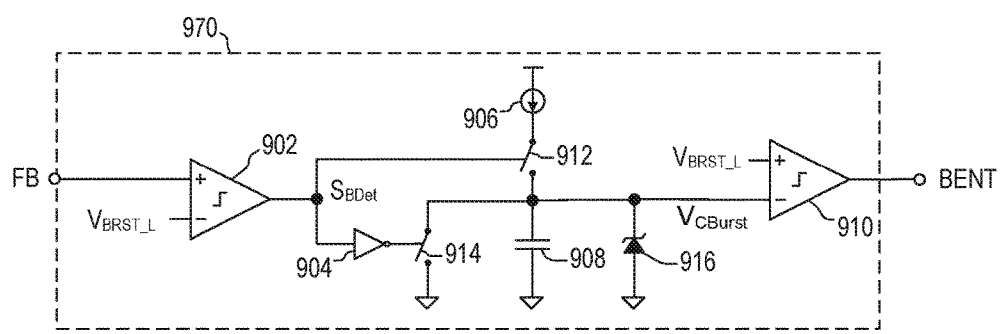
FIG. 9A illustrates a burst entry detection circuit of a DC-DC converter according to an embodiment.

FIG. 9A illustrates a burst entry detection circuit 970 of a DC-DC converter according to an embodiment. The burst entry detection circuit 970 is suitable for use as the burst entry detection circuit 670 of FIG. 6.

The burst entry detection circuit 970 includes first and second comparators 902 and 910, an inverter 904, a current source 906, a capacitor 908, and first and second switch devices 912 and 914. The burst entry detection circuit 970 receives a feedback signal FB and generates a burst entry signal BENT according to a value of the feedback signal FB and a burst low threshold $V_{BRST\_L}$.

The first comparator 802 compares the value of the feedback signal FB to the burst low threshold $V_{BRST\_L}$ and asserts a burst detect signal $S_{BDet}$ to indicate that the feedback signal FB has a value greater than the burst low threshold $V_{BRST\_L}$. The burst detect signal $S_{BDet}$ output by the first comparator 802 is provided to the first switch device 912 and to an input of the inverter 904. An output of the inverter 904 is provided to the second switch 914.

The current source 906 is coupled to a first conduction terminal of the first switch device 912. A second conduction terminal of the first switch device 912 is coupled to a first terminal of the capacitor 908. A second terminal of the capacitor 908 is coupled to a ground. First and second conduction terminals of the second switch 914 are respectively coupled to the first and second terminals of the capacitor 908. A Zener diode 916 is coupled across the terminals of the capacitor 908.

Accordingly, the capacitor 908 is discharged by the second switch device 914 when the burst detect signal $S_{BDet}$ is de-asserted, and is charged at a rate determined by a capacitance of the capacitor 908 and a current of the current source 906 when the detect signal $S_{BDet}$ is asserted, producing the ramp signal $V_{CBurst}$. A slope of the ramp signal $V_{CBurst}$ is equal to a magnitude of the current provided by the current source 906 divided by the capacitance of the capacitor 908. A magnitude of the ramp signal $V_{CBurst}$ is proportional to a duration of the value of the feedback signal FB being continuously greater than the burst low threshold $V_{BRST\_L}$. The value of the ramp signal $V_{CBurst}$ is clamped by the Zener diode 916. In an embodiment, the breakdown voltage of the Zener diode 916 is equal to the burst low threshold $V_{BRST\_L}$.

The second comparator 910 compares the ramp signal $V_{CBurst}$ to the burst low threshold $V_{BRST\_L}$ to produce the burst entry signal BENT. The second comparator 910 asserts the burst entry signal BENT when the burst low threshold $V_{BRST\_L}$ is less than the burst low threshold $V_{BRST\_L}$, and de-asserts the burst entry signal BENT.

Figure 9B:
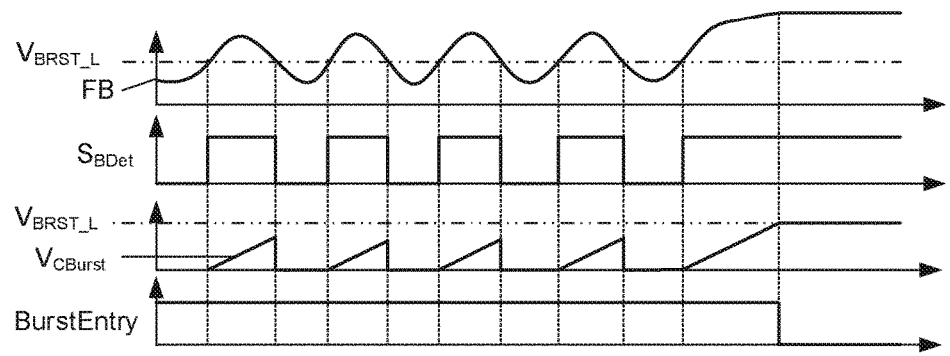
FIG. 9B illustrates waveforms of an operation of a burst entry detection circuit of FIG. 9A according to an embodiment.

FIG. 9B illustrates waveforms of the above-described operation of the burst entry detection circuit 970 of FIG. 9A, according to an embodiment. As can be seen in FIG. 9B, the burst entry detection circuit 970 asserts the burst entry signal BENT when the feedback signal FB has not been continuously greater than the burst low threshold $V_{BRST\_L}$ for a predetermined duration determined by dividing the value of the burst low threshold $V_{BRST\_L}$ by the slope of the ramp signal $V_{CBurst}$, and de-asserts the burst entry signal BENT otherwise.

Figure 10:
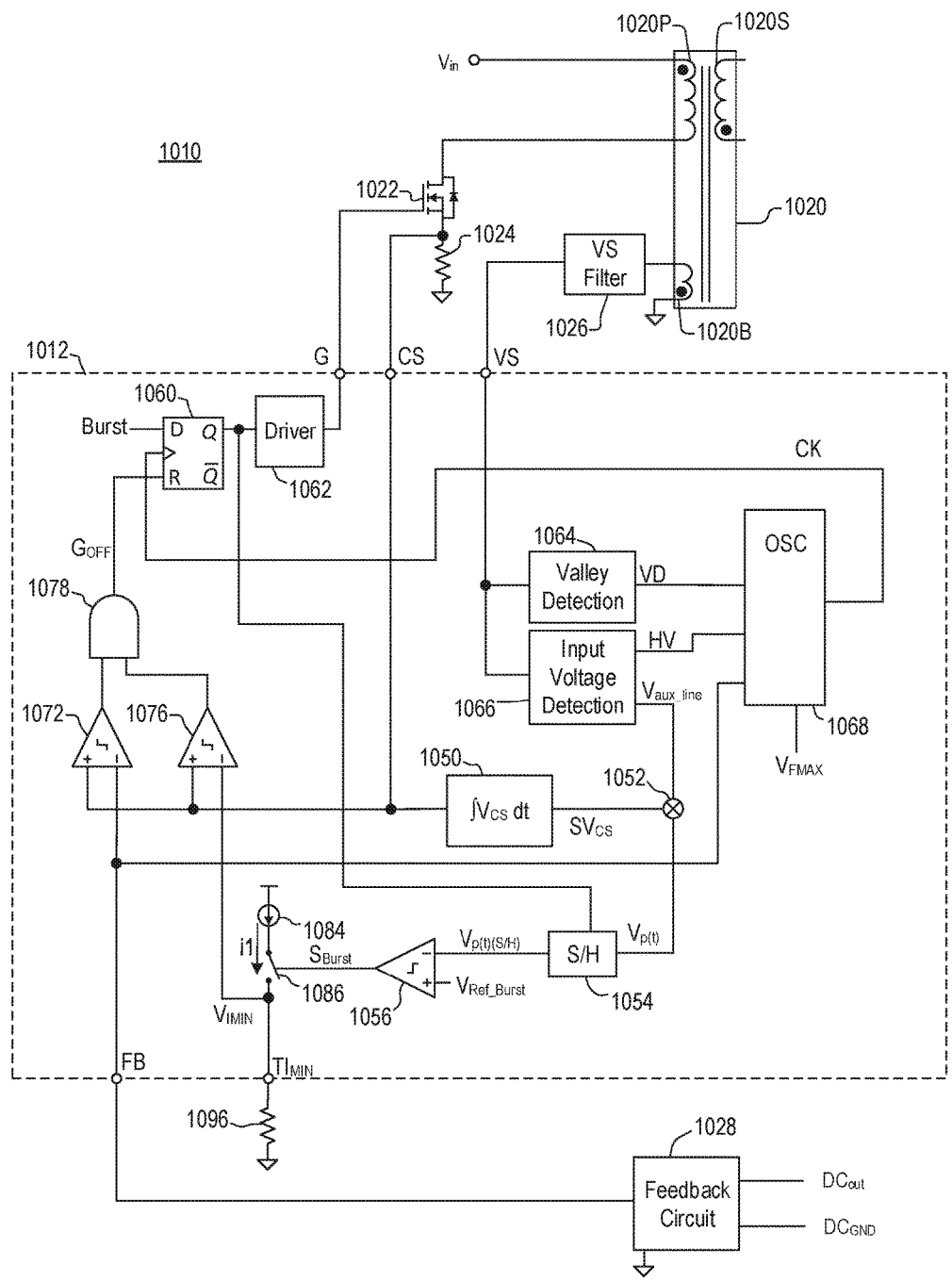
FIG. 10 illustrates portions of a DC-DC converter including a SMPS controller according to another embodiment.

FIG. 10 illustrates portions of a DC-DC converter 1010 including an SMPS controller 1012 according to an embodiment. Elements of FIG. 10 having references characters (e.g., 10XX) for which elements of FIG. 4 have corresponding references characters (e.g., 4XX) are as described for the corresponding element of FIG. 4, unless stated otherwise. For example, the valley detection circuit 1064 of FIG. 10 is as described for the valley detection circuit 464 of FIG. 4.

Differences between FIG. 10 and FIG. 4 include replacement of second and third comparators 474 and 476 by a second comparator 1076, the removal of current source 482, the removal of low line threshold configuration pin $TC_L$ and high line threshold configuration pin $TC_L$, and the removal of low and high threshold resistors 492 and 496. Further differences include the addition of an integrator circuit 1050, a multiplier circuit 1052, a sample and hold circuit 1054, a burst comparator 1056, a minimum current terminal $TI_{MIN}$, and a minimum current threshold resistor 1096.

Furthermore, in addition to the high voltage detect signal HV produced as described for the input voltage detection circuit 466, the input voltage detection circuit 1066 produces an auxiliary line voltage signal $V_{aux\_line}$ that corresponds to a value of the input voltage $V_{in}$ when the switching device 1022 is turned on.

The integrator circuit 1050 receives the current sense signal CS and produces an integrated current signal $SV_{CS}$ by integrating a voltage value of the current sense signal CS over time. The multiplier circuit 1052 receives the integrated current signal $SV_{CS}$ and the auxiliary line voltage signal $V_{aux\_line}$ and produces an estimated power signal $V_{p(t)}$ by multiplying the integrated current signal $SV_{CS}$ by the auxiliary line voltage signal $V_{aux\_line}$.

The sample and hold circuit 1054 samples the estimated power signal $V_{p(t)}$ when the output Q of the output latch 1060 is asserted and produces a sampled estimated power signal $V_{p(t)S/H}$ by holding the last sampled value of the estimated power signal $V_{p(t)}$ as the sampled estimated power signal $V_{p(t)S/H}$ in response to the de-assertion of the output Q of the output latch 1060. As a result, the sample and hold circuit 1054 samples and holds a peak value of the estimated power signal $V_{p(t)}$, which is proportional to a power being supplied by the DC-DC converter 1010.

The burst comparator 1056 compares the sampled estimated power signal $V_{p(t)S/H}$ to a predetermined burst threshold voltage $V_{Ref\_Burst}$. An output $S_{BURST}$ of the burst comparator 1056 turns a switch 1086 on when the sampled estimated power signal $V_{p(t)S/H}$ is less than the burst threshold voltage $V_{Ref\_Burst}$, and turns the switch 1086 off otherwise. The switch 1086 being on indicates that the DC-DC converter 1010 is operating in burst mode, and the being off indicates that the DC-DC converter 1010 is operating in non-burst (continuous) mode. Accordingly, the integrator circuit 1050, the multiplier circuit 1052, the sample and hold circuit 1054, and the burst comparator 1056 determine the burst operation based on the current sense signal CS.

The switch 1086 off receives an output of a current source 1084. When the switch 1086 is on, the switch 1086 provides a current i1 to the minimum current terminal $TI_{MIN}$. When the switch 1086 is off, no current is provided to the minimum current terminal $TI_{MIN}$.

The minimum current threshold resistor 1096 is coupled between the minimum current terminal $TI_{MIN}$ and a ground. As a result, a minimum current voltage $V_{IMIN}$ is generated at the minimum current terminal $TI_{MIN}$.

The minimum current voltage $V_{IMIN}$ is produced with a value of zero volts when the sampled estimated power signal $V_{p(t)S/H}$ is greater than the burst threshold voltage $V_{Ref\_Burst}$, that is, when the estimated power being output by the DC-DC converter 1010 is greater than a predetermined value. The minimum current voltage $V_{IMIN}$ is produced with a value equal to the product of a resistance of the minimum current threshold resistor 1096 and a magnitude of the current i1 when the sampled estimated power signal $V_{p(t)S/H}$ is less than the burst threshold voltage $V_{Ref\_Burst}$, that is, when the estimated power being output by the DC-DC converter 1010 is less than the predetermined value.

The AND gate 1078, first comparator 1072, and second comparator 1076 operate to produce a gate off signal $G_{OFF}$ according to voltage values of the current sense signal CS, the feedback signal FB, and the minimum current voltage $V_{IMIN}$. Because the minimum current voltage $V_{IMIN}$ is 0 when not in burst mode, the gate off signal $G_{OFF}$ is equal to:

$$G_{OFF} = \begin{cases} CS > FB, \text{ when not in burst mode} \\ CS > MAX(FB, V_{IMIN}), \text{ when in burst mode} \end{cases} \quad \text{Equation 5}$$

When the gate off signal $G_{OFF}$ is asserted, the output latch 1060 is reset, the output Q of the output latch 1060 goes low, and the switching device 1022 is turned off. The output Q of the output latch 1060 will go high on the next pulse on the clock signal CK when the burst signal BURST is high.

Figure 11:
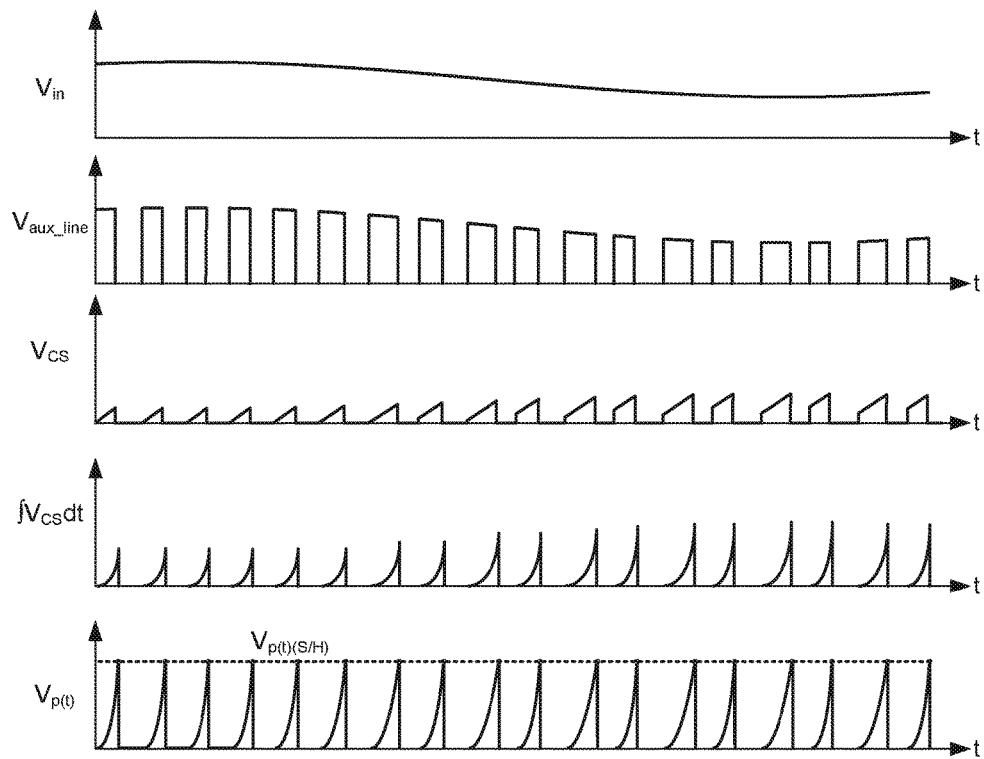
FIG. 11 illustrates waveforms of an operation of the DC-DC converter of FIG. 10 according to an embodiment.

FIG. 11 illustrates waveforms of power estimation operation of the DC-DC converter 1010 of FIG. 10 according to an embodiment. The waveforms show operation at a constant output power.

As an input voltage $V_{IN}$ varies, a value of the auxiliary line voltage signal $V_{aux\_line}$ while the switching device 1022 is on is proportional to the value of the input voltage $V_{IN}$. As the input voltage $V_{IN}$ decreases, the integral of the current sense voltage $V_{CS}$ increases in inverse proportion. As a result, the product of the auxiliary line voltage signal $V_{aux\_line}$ and the integral of the current sense voltage $V_{CS}$, i.e., the estimated power signal $V_{p(t)}$, remains in proportion to output power of the DC-DC converter 1010. Accordingly, the sampled estimated power signal $V_{p(t)S/H}$, shown as a dotted line, remains constant.

Figure 12:
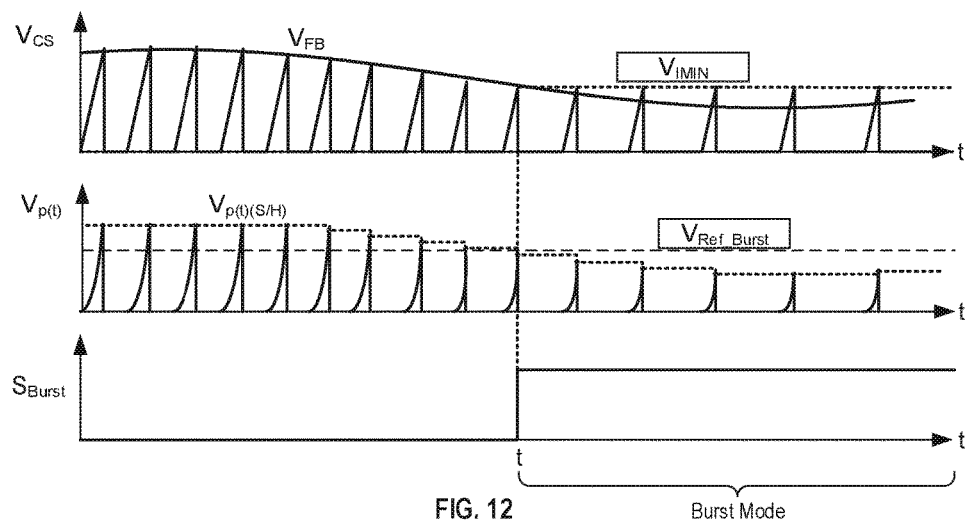
FIG. 12 illustrates waveforms of a burst mode operation of the DC-DC converter of FIG. 10 according to an embodiment.

FIG. 12 illustrates waveforms of a burst mode operation of the DC-DC converter 1010 of FIG. 10 according to an embodiment. In FIG. 12, the output power of the DC-DC converter 1010 decreases over time, as reflected in the stepwise decreasing value of the sampled estimated power signal $V_{p(t)S/H}$.

At a time t, the sampled estimated power signal $V_{p(t)S/H}$ drops below a predetermined burst entry threshold voltage $V_{Ref\_Burst}$. In response, the output $S_{BURST}$ of the burst comparator 1056 is asserted.

Figure 13:
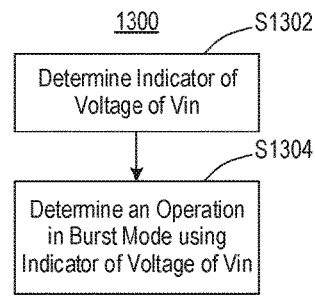
FIG. 13 illustrates a process for controlling a DC-DC converter according to an embodiment.

FIG. 13 illustrates a process 1300 for controlling a DC-DC converter according to an embodiment. The process 1300 may be performed by, for example, the SMPS controller 112 of the DC-DC converter 110 of FIG. 1, wherein the SMPS controller 112 controls an operation of the DC-DC converter 110 using a plurality of foldback curves selected according to an indicator of a voltage value of an input voltage $V_{IN}$ of the DC-DC converter 110.

At S1304, the process 1300 determines a value of an indicator of a voltage value of an input voltage Vin of the DC-DC converter. In an embodiment, the process 1300 determines respective values of two or more indicators.

In an embodiment, the indicator may have a plurality of discrete states respectively corresponding to a range of voltages for the input voltage Vin. For example, the indicator may have first and second states corresponding to high and low line ranges, where the high line range may correspond to a range including Root-Mean-Square (RMS) voltages between 180 and 265 volts for the input voltage Vin, and the low line range may correspond to a range including RMS voltages between 90 and 130 volts for the input voltage Vin. The indicator may have the first state when the RMS voltage of the input voltage Vin is greater than a threshold, e.g., 155 volts, and have the second state when the RMS voltage of the input voltage Vin is less than the threshold.

In another embodiment, the indicator may have a value corresponding to an instantaneous voltage value of the input voltage Vin. For example, the indicator may have a value corresponding to an instantaneous voltage value of the input voltage Vin during periods of time when a primary winding of the DC-DC converter is being supplied with current from the input voltage Vin.

At S1304, the process 1300 determines whether or how to operate the DC-DC converter in burst mode using the one or more indicators. In an embodiment, the process 1300 determines a minimum current voltage according to the indicator and determines whether to operate in the burst mode using the minimum current voltage. In another embodiment, the process 1300 determines an estimated output power of the DC-DC converter using the indicator and determines whether to operate in the burst mode using the estimated output power.

Figure 14:
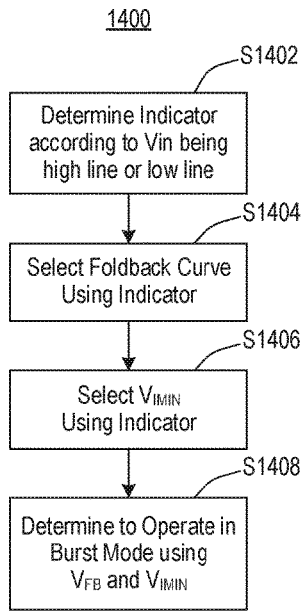
FIG. 14 illustrates a process for controlling a DC-DC converter according to an embodiment.

FIG. 14 illustrates a process 1400 for controlling a DC-DC converter according to an embodiment. The process 1400 may be performed using the SMPS controller 412 in the DC-DC converter 410 of FIG. 4.

At S1402, the process 1400 determines an indicator having a first value if an input voltage of the DC-DC controller corresponds to a high line and having a second value if the input voltage of the DC-DC controller corresponds to a low line.

At S1404, the process 1400 selects, using the indicator, a foldback curve for controlling a blanking interval of the DC-DC controller from a plurality of foldback curves.

At S1406, the process 1400 selects, using the indicator, a minimum current voltage $V_{IMIN}$. The minimum current voltage $V_{IMIN}$ may be selected by controlling whether a high line minimum current voltage is 0 or a predetermined high line minimum current threshold voltage using the indicator, and using the maximum of the high line minimum current voltage and a low line minimum current threshold voltage as the minimum current voltage $V_{IMIN}$. The minimum current voltage $V_{IMIN}$ may also be used to control a duration of an on state of switching device of the DC-DC controller.

At S1408, process 1400 determines whether to operate the DC-DC converter in a burst mode using the selected minimum current voltage $V_{IMIN}$ and a feedback voltage $V_{FB}$ corresponding to an output voltage of the DC-DC converter. For example, in an embodiment wherein the feedback voltage $V_{FB}$ decreases as the output voltage increases, the process 1400 may determine to operate the DC-DC converter in the burst mode when the feedback voltage $V_{FB}$ is less than the minimum current voltage $V_{IMIN}$.

Figure 15:
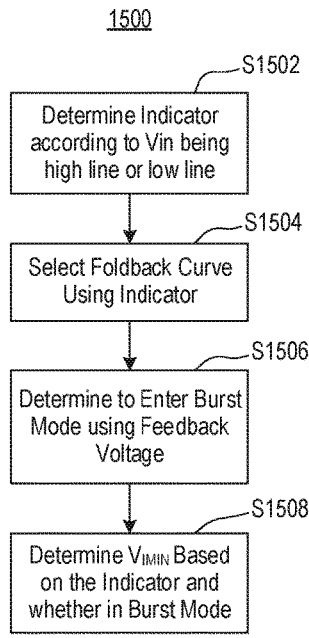
FIG. 15 illustrates a process for controlling a DC-DC converter according to an embodiment.

FIG. 15 illustrates a process 1500 for controlling a DC-DC converter according to an embodiment. The process 1500 may be performed using the SMPS controller 612 in the DC-DC converter 610 of FIG. 6.

At S1502, the process 1500 determines an indicator having a first value if an input voltage of the DC-DC controller corresponds to a high line and having a second value if the input voltage of the DC-DC controller corresponds to a low line.

At S1504, the process 1500 selects, using the indicator, a foldback curve for controlling a blanking interval of the DC-DC converter from a plurality of foldback curves.

At S1506, the process 1500 determines to operate in a burst mode using a feedback voltage $V_{FB}$, the feedback voltage $V_{FB}$ corresponding to an output voltage of the DC-DC converter. In an embodiments wherein a value of the feedback voltage $V_{FB}$ decreases with an increase in the output voltage, in a first embodiment the process 1500 determines to operate in the burst mode when the feedback voltage $V_{FB}$ averaged over a period of time is less than a predetermined threshold, and in a second embodiment the process 1500 determines to not operate in the burst mode when the feedback voltage $V_{FB}$ has been continuously greater than the predetermined threshold for greater than a predetermined period of time.

At S1508, the process 1500 determines, using the indicator and based on whether the DC-DC converter is operating in the burst mode, a minimum current voltage $V_{IMIN}$. In an embodiment, the minimum current voltage $V_{IMIN}$ is equal to a high line minimum current threshold voltage when the indicator has the first value, the DC-DC converter is operating in burst mode, or both. The minimum current voltage $V_{IMIN}$ is equal to a low line minimum current threshold voltage only when the indicator has the second value and the DC-DC converter is not operating in the burst mode.

Figure 16:
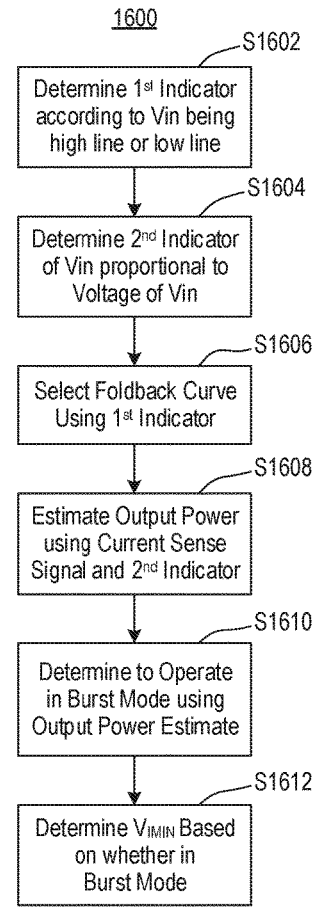
FIG. 16 illustrates a process for controlling a DC-DC converter according to an embodiment.

FIG. 16 illustrates a process 1600 for controlling a DC-DC converter according to an embodiment. The process 1600 may be performed using the SMPS controller 1012 in the DC-DC converter 1010 of FIG. 10.

At S1602, the process 1600 determines a first indicator having a first value if an input voltage of the DC-DC controller corresponds to a high line and having a second value if the input voltage of the DC-DC controller corresponds to a low line.

At S1604, the process 1600 determines a second indicator have a value corresponding to an input voltage Vin of the DC-DC converter. In an embodiment, the value of the second indicator corresponds to a voltage across a primary winding of a transformer of the DC-DC converter during times when the primary side main switch turns on. In an embodiment, the value of the second indicator is determined using an auxiliary winding of the transformer.

At S1606, the process 1600 selects, using the first indicator, a foldback curve for controlling a blanking interval of the DC-DC converter from a plurality of foldback curves.

At S1608, the process 1600 determines, using the second indicator, an estimated output power of the DC-DC converter. In an embodiment, the process 1600 determines the estimated output power according to a peak value of a product of the second indicator and an integral over time of a current sense voltage, the current sense voltage corresponding to a current through the primary winding of the transformer.

At S1610, the process 1600 determines whether the DC-DC converter is to operate in burst mode according to the estimated output power. In an embodiment, the process 1600 causes the DC-DC converter to operate in burst mode when the estimated output power is lower than a predetermined threshold.

At S1612, the process 1600 determines a minimum current voltage $V_{IMIN}$ according to whether the DC-DC converter is operating in burst mode. In an embodiment, the minimum current voltage $V_{IMIN}$ has a predetermined value when the DC-DC converter is operating in burst mode, and has a value of zero otherwise.

The minimum current voltage $V_{IMIN}$ is used to control an on time of a switching device used to control current flowing through the primary winding of the transformer. The one time may be determined according to a maximum of a feedback voltage and the minimum current voltage $V_{IMIN}$, wherein the feedback voltage decreases as the output voltage of the DC-DC converter increases.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A circuit for a Direct Current to Direct Current (DC-DC) converter, the circuit comprising:
    an input voltage detection circuit to produce, using a voltage sense signal, a first input voltage indicator, the first input voltage indicator indicating a voltage range selected from a plurality of voltage ranges;
    an oscillator circuit to select, using the first indicator, a foldback curve from a plurality of foldback curves, the foldback curve to determine a blanking time of a gate signal; and
    a burst entry detection circuit to determine, using an indicator of an output power of the DC-DC converter, whether to operate the circuit in a burst mode.

2. The circuit of claim 1, wherein the burst entry detection circuit is to:
    receive a feedback signal corresponding to an output voltage of the DC-DC converter, a first minimum current threshold, and a second minimum current threshold;
    determine to operate the circuit in the burst mode in response to the first indicator indicating a first voltage range of the plurality of voltage ranges and the feedback signal being less than the first minimum current threshold or in response to the first indicator indicating a second voltage range of the plurality of voltage ranges and the feedback signal being less than the second minimum current threshold; and
    determine to not operate the circuit in the burst mode in response to the first indicator indicating a first voltage range and the feedback signal being greater than the first minimum current threshold or in response to the first indicator indicating a second voltage range and the feedback signal being greater than the second minimum current threshold.

3. The circuit of claim 2, wherein the burst entry detection circuit is to:
    receive a current sense signal;
    determine an on time of the gate signal by comparing the current sense signal to the first minimum current threshold when the circuit is operating in the burst mode and the first indicator indicates the first voltage range;
    determine the on time of the gate signal by comparing the current sense signal to the second minimum current threshold when the circuit is operating in the burst mode and the first indicator indicates the second voltage range; and
    determine the on time of the gate signal by comparing the current sense signal to the feedback signal when the circuit is not operating in the burst mode.

4. The circuit of claim 3, further comprising:
    a first current threshold generating circuit to generate the first minimum current threshold having a first predetermined value when the first indicator indicates the first voltage range and having a value of zero otherwise; and
    a second current threshold generating circuit to generate the second minimum current threshold having a second predetermined value,
    wherein the burst entry detection circuit is to determine an on time of the gate signal according to a greater of the value of the first minimum current threshold and the value of the second minimum current threshold when the circuit is operating in the burst mode.

5. The circuit of claim 1, wherein the burst entry detection circuit is to determine to operate the circuit in the burst mode according to a feedback signal and a predetermined threshold, the feedback signal corresponding to an output voltage of the DC-DC converter.

6. The circuit of claim 5, further comprising an on time determination circuit to:
    receive a current sense signal;
    determine an on time of the gate signal according to the current sense signal and a first minimum current threshold when the circuit is operating in the burst mode or when the first indicator indicates the first voltage range;
    determine the on time of the gate signal according to the current sense signal and a greater of the value of the second minimum current threshold and the value of the feedback signal when the circuit is not operating in the burst mode and the first indicator indicates the second voltage range; and
    determine the on time of the gate signal according to the current sense signal and a greater of the value of the first minimum current threshold and the value of the feedback signal when the circuit is not operating in the burst mode and the first indicator indicates the first voltage range.

7. The circuit of claim 1, further comprising:
    wherein the input voltage detection circuit is to produce, using a voltage sense signal, a second input voltage indicator, the second input voltage indicator having a value corresponding to a voltage of the primary side of the DC-DC converter;
    wherein the burst entry detection circuit is to:
        receive a current sense signal corresponding to a current of a primary side of the DC-DC converter and the second indicator;
        determine, using the current sense signal and the second indicator, an estimated power output of the DC-DC converter; and
        determine to operate the circuit in the burst mode in response to the estimated power output being less than a predetermined threshold.

8. The circuit of claim 7, wherein the burst entry detection circuit is to:
    integrate the current sense signal to produce an integrated current signal;
    multiply the integrated current signal by the second indicator to produce an estimated power signal;
    sample and hold the estimated power signal to produce a sampled estimated power signal, the sampled estimated power signal corresponding to the estimated power output; and
    determine to operate the circuit in the burst mode in response to the sampled estimated power signal being less than the predetermined threshold.

9. A circuit to control a switching power converter, the circuit comprising:
    an input voltage detection circuit to produce a first indication according to a voltage sense signal, the voltage sense signal corresponding to an input voltage to the switching power converter;

an oscillator to select, according to the first indication, a foldback curve from a plurality of foldback curves, determine a blanking time of a gate signal using the selected foldback curve, and produce a clock signal for asserting the gate signal according to the blanking time; and a circuit including a plurality of comparators, the circuit to produce a gate off signal to control an on time of the gate signal, each of the plurality of comparators having an input coupled to a current sense signal, a first comparator of the plurality of comparators having an input coupled to a feedback signal, the current sense signal corresponding to a current through a switching device controlled according to the gate signal, and the feedback signal corresponding to an output voltage of the switching power converter, wherein the circuit determines to enter a burst mode in response to determining that an output power of the switching power converter is below a predetermined threshold.

10. The circuit of claim 9, further comprising:
a first threshold circuit producing a first minimum current threshold voltage according to the first indication and a first predetermined value;
a second comparator of the plurality of comparators having an input coupled to the first minimum current threshold voltage;
a third comparator of the plurality of comparators having an input coupled to a second minimum current threshold voltage having a second predetermined value; and
an AND gate having inputs respectively coupled to outputs of the first, second, and third comparators,
wherein the gate off signal is produced used the output of the AND gate.

11. The circuit of claim 10, wherein the first threshold circuit comprises a switch controlled using the first indication, and a value of the first minimum current threshold voltage is determined according to whether the switch is open or closed.

12. The circuit of claim 11, further comprising:
a burst entry detection circuit to determine, using the feedback signal, a burst entry signal, the burst entry signal indicating whether the output power of the switching power converter is below a predetermined threshold,
wherein the circuit enters the burst mode in response to the burst entry signal.

13. The circuit of claim 9, further comprising:
the input voltage detection circuit to produce a second indication according to a voltage sense signal, the second indication corresponding to a voltage of the input voltage;
a burst entry detection circuit to produce, using the current sense signal and the second indicator, a power estimate of the switching power converter, and to determine a burst entry signal by comparing the power estimate to a predetermined threshold,
wherein the circuit enters the burst mode in response to the burst entry signal.

14. A method for controlling a switching power converter, the method comprising:
determining, according to an input voltage of the switching power converter, a voltage range of a plurality of voltage ranges;
selecting a foldback curve of a plurality of foldback curves according to the voltage range;

determining a blanking time of a switching device of the switching power converter according to the selected foldback curve and a feedback signal, the feedback signal corresponding to an output voltage of the switching power converter;
operating the switching power converter in a burst mode in response to an indication that an output power of the switching power converter is below a predetermined power threshold and a first foldback curve is selected; and
operating the switching power converter in a burst mode in response to the indication that an output power of the switching power converter is below the predetermined power threshold when a second foldback curve is selected, the second foldback curve being different than the first foldback curve,
wherein a value of the feedback signal corresponding to the predetermined power threshold on the first foldback curve corresponds to a power level substantially above the predetermined power threshold on the second foldback curve.

15. The method of claim 14, further comprising:
determining an on time of the switching device using the feedback signal, a current sense signal, and a first minimum current threshold when the first foldback curve is selected; and
determining an on time of the switching device using the feedback signal, the current sense signal, and a second minimum current threshold when the second foldback curve is selected and the switching power converter is not operating in the burst mode,
wherein the current sense signal corresponds to a current through the switching device.

16. The method of claim 15, further comprising:
producing the indication that the output power of the switching power converter is below the predetermined power threshold when the feedback signal is less than a first predetermined minimum current voltage when the first foldback curve is selected; and
producing the indication that the output power of the switching power converter is below the predetermined power threshold when the feedback signal is less than a second predetermined minimum current voltage when the second foldback curve is selected, the second predetermined minimum current voltage being different from the first predetermined minimum current voltage.

17. The method of claim 15, further comprising:
producing the indication that the output power of the switching power converter is below the predetermined power threshold when a time-averaged value of the feedback signal is less than a burst mode entry voltage; and
determining an on time of the switching device using the feedback signal, the current sense signal, and the first minimum current threshold when the second foldback curve is selected and the switching power converter is operating in the burst mode.

18. The method of claim 15, further comprising:
producing the indication that the output power of the switching power converter is below the predetermined power threshold when a value of the feedback signal has been continuously less than a burst mode entry voltage for a predetermined duration; and
determining an on time of the switching device using the feedback signal, the current sense signal, and the first minimum current threshold when the second foldback curve is selected and the switching power converter is operating in the burst mode.

19. The method of claim 15, further comprising:
selecting the foldback curve in response to the voltage range and whether the switching power converter is operating in the burst mode, including selecting the first foldback curve when a first voltage range is determined or the switching power converter is operating in the burst mode, and selecting the second foldback curve when a second voltage range is determined and the switching power converter is not operating in the burst mode.

20. The method of claim 14, further comprising:
determining, according to the input voltage of the switching power converter, a voltage signal corresponding to a value of the input voltage when power is being supplied to a primary winding of the switching power converter;
producing an integrated current sense signal by integrating a current sense signal, the current sense signal corresponding to a current of the switching device when power is being supplied to the primary winding;
producing a power output estimate by multiplying the integrated current sense signal by the voltage signal; and
producing the indication that the output power of the switching power converter is below the predetermined power threshold using the power output estimate and a predetermined threshold value corresponding to the predetermined power threshold.

* * * * *